United States Patent
Cox et al.

(10) Patent No.: US 9,810,855 B2
(45) Date of Patent: Nov. 7, 2017

(54) FIBER OPTIC CONNECTORS AND SUB-ASSEMBLIES WITH STRENGTH MEMBER RETENTION

(71) Applicant: Corning Optical Communications LLC, Hickory, NC (US)

(72) Inventors: Terry Dean Cox, Ft. Worth, TX (US); Micah Colen Isenhour, Lincolnton, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/949,952

(22) Filed: Nov. 24, 2015

(65) Prior Publication Data

US 2016/0147023 A1  May 26, 2016

Related U.S. Application Data

(60) Provisional application No. 62/084,668, filed on Nov. 26, 2014.

(51) Int. Cl.
*G02B 6/38* (2006.01)
*G02B 6/44* (2006.01)
*G02B 6/245* (2006.01)

(52) U.S. Cl.
CPC .......... *G02B 6/3887* (2013.01); *G02B 6/381* (2013.01); *G02B 6/387* (2013.01); *G02B 6/4476* (2013.01); *G02B 6/245* (2013.01)

(58) Field of Classification Search
CPC ..... G02B 6/3887; G02B 6/4476; G02B 6/387
See application file for complete search history.

(56) References Cited

U.S. PATENT DOCUMENTS

| 6,899,467 | B2 | 5/2005 | McDonald et al. |
| 7,090,406 | B2 | 8/2006 | Melton et al. |
| 7,090,407 | B2 | 8/2006 | Melton et al. |
| 7,111,990 | B2 | 9/2006 | Melton et al. |

(Continued)

FOREIGN PATENT DOCUMENTS

| JP | 6388806 | 4/1988 |
| WO | 2013019465 A1 | 2/2013 |
| WO | 2013025855 A1 | 2/2013 |

OTHER PUBLICATIONS

US 7,481,586, 01/2009, Lu et al. (withdrawn)

(Continued)

*Primary Examiner* — Jerry Rahll
(74) *Attorney, Agent, or Firm* — Michael E. Carroll, Jr.

(57) ABSTRACT

The disclosure relates to a fiber optic connectors and sub-assemblies having a retention body for connectorizing a fiber optic cable along with fiber optic connectors and methods therefor. In one embodiment, the sub-assembly comprises a cable lock comprises a cable channel for receiving a fiber optic cable therethrough, and at least one strength member engagement surface. The retention body comprises an optical fiber channel for receiving an end portion of at least one optical fiber of the fiber optic cable therethrough, and at least one strength member engagement surface. The strength member engagement surfaces of the cable lock and the retention body are configured to cooperate with each other to receive and retain at least one strength member of the fiber optic cable. Other fiber optic connector sub-assemblies are also disclosed.

37 Claims, 18 Drawing Sheets

(56) References Cited

U.S. PATENT DOCUMENTS

| | | |
|---|---|---|
| 7,113,679 B2 | 9/2006 | Melton et al. |
| 7,137,742 B2 | 11/2006 | Theuerkorn et al. |
| 7,244,066 B2 | 7/2007 | Theuerkorn |
| 7,264,402 B2 | 9/2007 | Theuerkorn et al. |
| 7,572,065 B2 | 8/2009 | Lu et al. |
| 7,654,747 B2 | 2/2010 | Theuerkorn et al. |
| 7,677,814 B2 | 3/2010 | Lu et al. |
| 7,744,288 B2 | 6/2010 | Lu et al. |
| 7,785,019 B2 | 8/2010 | Lewallen et al. |
| 7,942,590 B2 | 5/2011 | Lu et al. |
| 2001/0038770 A1 | 11/2001 | Nakajima et al. |
| 2011/0091172 A1 | 4/2011 | Coleman et al. |
| 2014/0286611 A1 | 9/2014 | Pratt et al. |

OTHER PUBLICATIONS

International Search Report and Written Opinion of the International Searching Authority; PCT/US2015/062105; dated May 17, 2016.

Invitation to Pay Additional Fees; PCT/US2015/062105; dated March 4, 2016; 9 Pages.

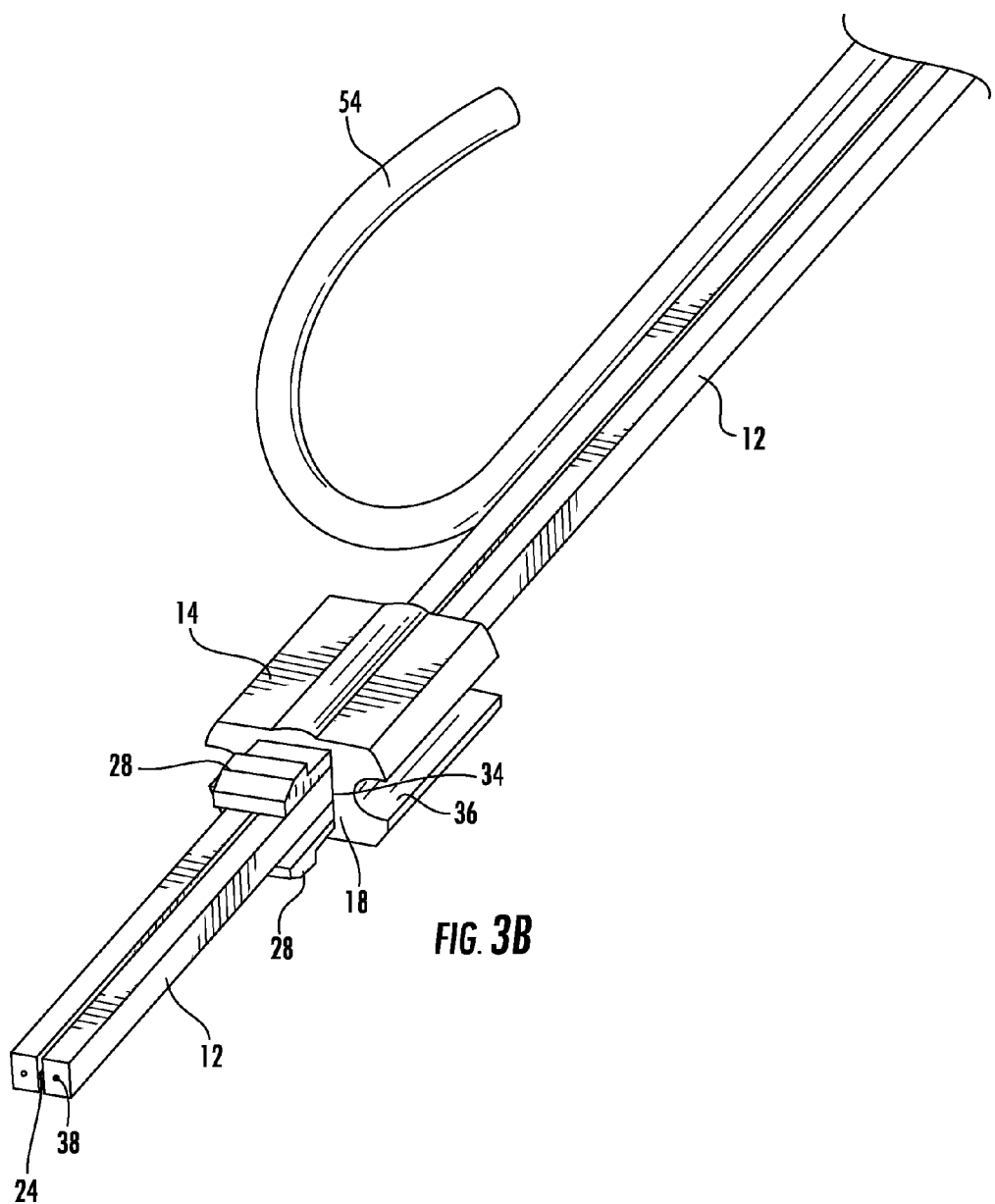

FIBER OPTIC CONNECTORS AND SUB-ASSEMBLIES WITH STRENGTH MEMBER RETENTION

PRIORITY APPLICATION

This application claims the benefit of priority under 35 U.S.C. §119 of U.S. Provisional Application Ser. No. 62/084,668, filed on Nov. 26, 2014, the content of which is relied upon and incorporated herein by reference in its entirety.

BACKGROUND

The disclosure relates generally to fiber optic connectors and more particularly to a connectors and assemblies with cable retention and locking features which may be used to route and retain strength members of a fiber optic cable.

Many fiber optic cables include one or more strength members to secure the fiber optic cable to a body or other component of a fiber optic connector when the optical fiber(s) of the fiber optic connector are disposed in a connector ferrule. This permits the fiber optic cable to be secured to the fiber optic connector independently of the optical fiber, thereby reducing the mechanical stress on the optical fiber during handling of the fiber optic connector and cable. Some fiber optic cables, such as Pixian™-type cables, include a pair of strength member sheathings each having one or more strength members disposed therein. During fiber optic connector assembly, end portions of the sheathings are peeled away from the corresponding end portion of the optical fiber, with the strength members remaining enclosed by the respective strength member sheathings. The respective strength member sheathings can then be individually stripped away from the respective strength members so that the strength members can be directly secured within the fiber optic connector.

This arrangement presents a number of challenges, however, including the need to separately remove the strength member sheathings individually. This labor intensive process, in turn, also creates wasted material. Accordingly, there is a need for an efficient and less labor-intensive connectorization process.

SUMMARY

One embodiment of the disclosure relates to a fiber optic connector having a cable lock and a retention body for connectorizing a fiber optic cable. The cable lock comprises a cable channel for receiving a fiber optic cable therethrough, and at least one strength member engagement surface. The retention body comprises an optical fiber channel for receiving an end portion of at least one optical fiber of the fiber optic cable therethrough, and at least one strength member engagement surface. The strength member engagement surfaces of the cable lock and the retention body are configured to cooperate with each other to receive and retain at least one strength member of the fiber optic cable. A ferrule of the fiber optic connector is configured to receive and retain the end portion of the optical fiber, and a fiber optic connector housing sub-assembly encloses the cable lock, retention body, and ferrule. One advantage of this arrangement is that additional components, such as a crimp band or epoxy, for example, may not be required to couple the cable to the fiber optic connector sub-assembly. Instead, by mechanically coupling the strength members to the locking mechanism, the cable can be securely and efficiently coupled to the fiber optic connector sub-assembly with a tensile strength exceeding that of a chemical bond, such as an epoxy for example. In addition, this arrangement does not require removal of a strength member jacket from the strength member prior to coupling the cable to the fiber optic connector sub-assembly, thereby further simplifying the process of connectorizing the fiber optic cable.

An exemplary embodiment of the disclosure relates to a fiber optic connector sub-assembly for securing and retaining a fiber optic cable therein. The fiber optic connector sub-assembly comprises a cable lock comprising a cable channel for receiving a fiber optic cable therethrough, and at least one strength member engagement surface. The fiber optic connector sub-assembly further comprises a retention body comprising an optical fiber channel for receiving an end portion of at least one optical fiber of the fiber optic cable therethrough, and at least one strength member engagement surface. The strength member engagement surface of the retention body is configured to cooperate with the at least one strength member engagement surface of the cable lock to receive and retain at least one strength member of the fiber optic cable.

Another exemplary embodiment of the disclosure relates to a fiber optic connector. The fiber optic connector comprises a cable lock comprising a cable channel for receiving a fiber optic cable therethrough, and at least one strength member engagement surface. The fiber optic connector further comprises a retention body comprising an optical fiber channel for receiving an end portion of at least one optical fiber of the fiber optic cable therethrough, and at least one strength member engagement surface. The strength member engagement surface of the retention body is configured to cooperate with the at least one strength member engagement surface of the cable lock to receive and retain at least one strength member of the fiber optic cable. The fiber optic connector further comprises a ferrule configured to receive the end portion of the at least one optical fiber, and a fiber optic connector housing sub-assembly for enclosing and retaining the cable lock, retention body, and ferrule.

Another exemplary embodiment of the disclosure relates to a method of assembling a fiber optic connector. The method comprises inserting a fiber optic cable through a cable channel of a cable lock of a fiber optic connector sub-assembly, the fiber optic cable comprising at least one optical fiber, at least one strength member, and sheathing enclosing the at least one optical fiber and at least one strength member. The method further comprises removing at least one portion of the sheathing and a portion of the at least one strength member from an end portion of at least one optical fiber to expose an end portion of the at least one optical fiber. The method further comprises disposing the portion of the at least one strength member adjacent at least one strength member engagement surface of the cable lock. The method further comprises inserting the at least one optical fiber through an optical fiber channel of a retention body. The method further comprises connecting the cable lock to the retention body such that the portion of the at least one strength member is compressed between the at least one strength member engagement surface of the cable lock and at least one strength member engagement surface of the retention body.

Still another exemplary embodiment of the disclosure is directed to a fiber optic connector sub-assembly for securing and retaining fiber optic cable that does not require a cable lock. The fiber optic connector sub-assembly comprises a strength member securing element and a retention body. The retention body comprises an optical fiber channel for receiving an end portion of at least one optical fiber of the fiber optic cable therethrough and an internal splitting feature for separating at least one strength member sheathing from the fiber optic cable. The retention body of this embodiment may comprise one or more exit openings adjacent to the internal splitting feature. The internal splitting feature aids in separating the strength member sheathing from the optical fiber of the cable as the cable is inserted into the retention body.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 3A-3D are cross-sectional, perspective, top and side views of the cable lock and fiber optic cable of FIGS. 1A-1C;

DETAILED DESCRIPTION

One embodiment of the disclosure relates to a fiber optic connector having a cable lock and a retention body for connectorizing a fiber optic cable. The cable lock comprises a cable channel for receiving a fiber optic cable therethrough, and at least one strength member engagement surface. The retention body comprises an optical fiber channel for receiving an end portion of at least one optical fiber of the fiber optic cable therethrough, and at least one strength member engagement surface. The one or more strength member engagement surfaces of the cable lock and the retention body are configured to cooperate with each other to receive and retain at least one strength member of the fiber optic cable. According to any of the concepts disclosed herein, the strength member portion being secured may optionally include a portion of the sheath disposed about the strength member or the strength member may exclude a portion of the sheath depending on the fiber optic cable design and the method used for termination of the cable. A ferrule of the fiber optic connector is configured to receive and retain the end portion of the optical fiber, and a fiber optic connector housing sub-assembly encloses the cable lock, retention body, and ferrule. Any suitable fiber optic connector may be used with any of the concepts disclosed herein such as an epoxy-cured fiber optic connector such as a standard SC connector or a mechanical splice fiber optic connector such as a UniCam® connector available from Corning Optical Communications of Hickory, N.C. Likewise, the fiber optic connector according to any of the concepts disclosed herein may be any suitable type of connector such as SC, LC, ST, MPO or the like as desired.

One advantage of this arrangement is that additional components, such as a crimp band or epoxy, for example, may not be required to couple the cable to the fiber optic connector sub-assembly. Instead, by mechanically coupling the strength members to the locking mechanism, the cable can be securely and efficiently coupled to the fiber optic connector sub-assembly with a tensile strength exceeding that of a chemical bond, such as an epoxy for example. In addition, in certain arrangements the designs disclosed do not require removal of a strength member jacket from the strength member prior to coupling the cable to the fiber optic connector sub-assembly, thereby further simplifying the process of connectorizing the fiber optic cable.

Various embodiments will be further clarified by the following examples.

Figure 1A:
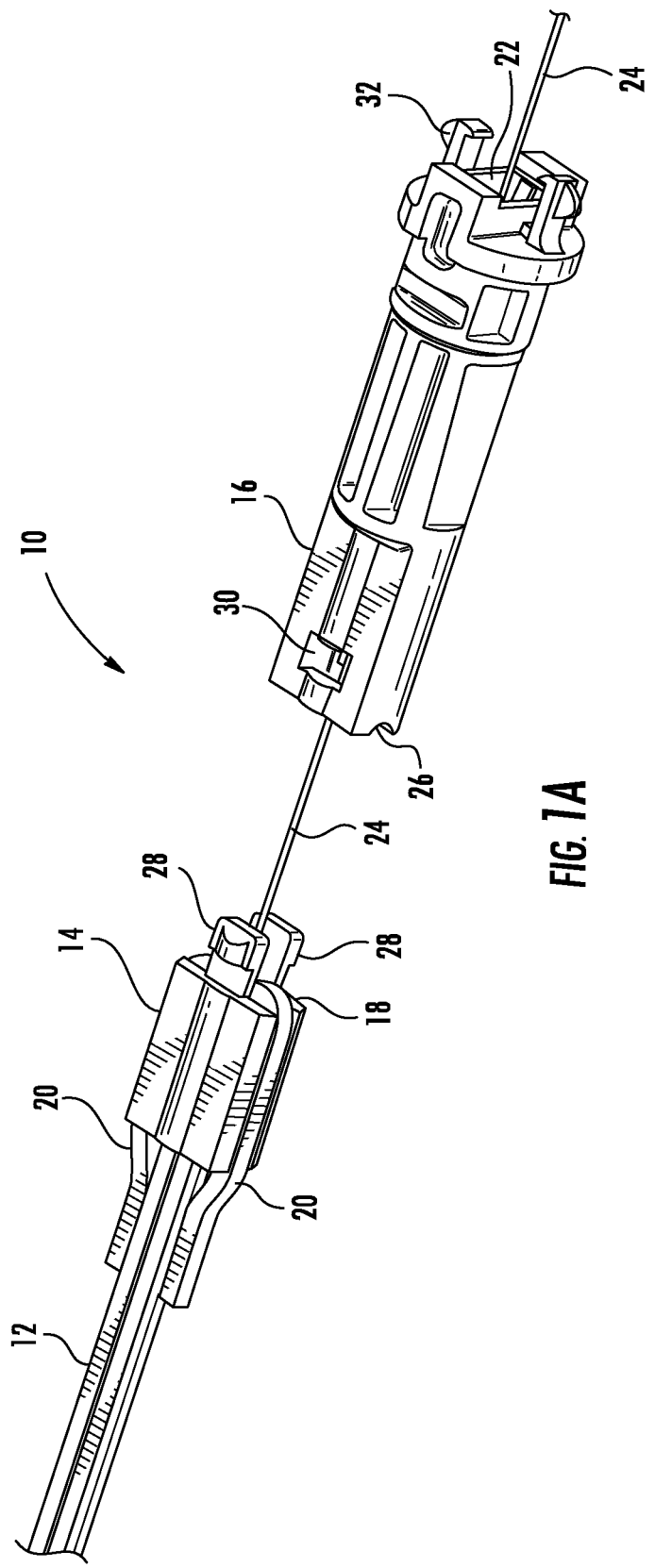
FIGS. 1A-1C are perspective views of a fiber optic connector sub-assembly for securing and retaining a fiber optic cable therein, according to an exemplary embodiment.

In this regard, FIG. 1A illustrates a disassembled view of a fiber optic connector sub-assembly 10 for securing and retaining a fiber optic cable 12 therein. The fiber optic connector sub-assembly 10 includes a cable lock 14 and a retention body 16. The cable lock 14 has a pair of strength member engagement surfaces 18 for receiving a portion of the strength member sheathing 20 of the fiber optic cable 12, each strength member sheathing containing one or more strength members (shown in FIG. 1C). Strength member sheathing also include a portion of a cable jacket when separated from the fiber optic cable; however, the concepts disclosed herein may be used with strength members that are secured to the cable lock and/or retention body without a sheathing portion. As will be discussed in detail below, the fiber optic cable 12 in this embodiment is a Pixian™-type cable and the fiber optic connector sub-assembly 10 is configured to be used in an OptiTap® type fiber optic connector. However, other types of fiber optic cables and fiber optic connectors may also be used.

In this embodiment, the retention body 16 has an optical fiber channel 22 for receiving an end portion of an optical fiber 24 of the fiber optic cable therethrough. In this embodiment, the pair of strength member sheathings 20, which enclose the optical fiber 24 of the fiber optic cable 12, are peeled back to expose the optical fiber 24. The optical fiber 24 is routed through the optical fiber channel 22 of the retention body 16, and the strength member sheathings 20 are disposed against, or otherwise adjacent to, the respective strength member engagement surfaces 18.

When the cable lock 14 is connected to the retention body 16, the strength member sheathings 20 are retained and compressed between the strength member engagement surfaces 18 of the cable lock 14 and complementary strength member engagement surfaces 26 of the retention body 16. In this embodiment, a pair of tabs 28 extending from the cable lock 14 engage with complementary slots 30 disposed in the retention body 16 to lock the cable lock 14 and retention body 16 together in a snap-fit arrangement. In this manner, the strength member engagement surfaces 18 of the cable lock 14 and the complementary strength member engagement surfaces 26 of the retention body 16 cooperate to receive and retain the strength member sheathings 20 of the fiber optic cable 12 therein.

Figure 2A:
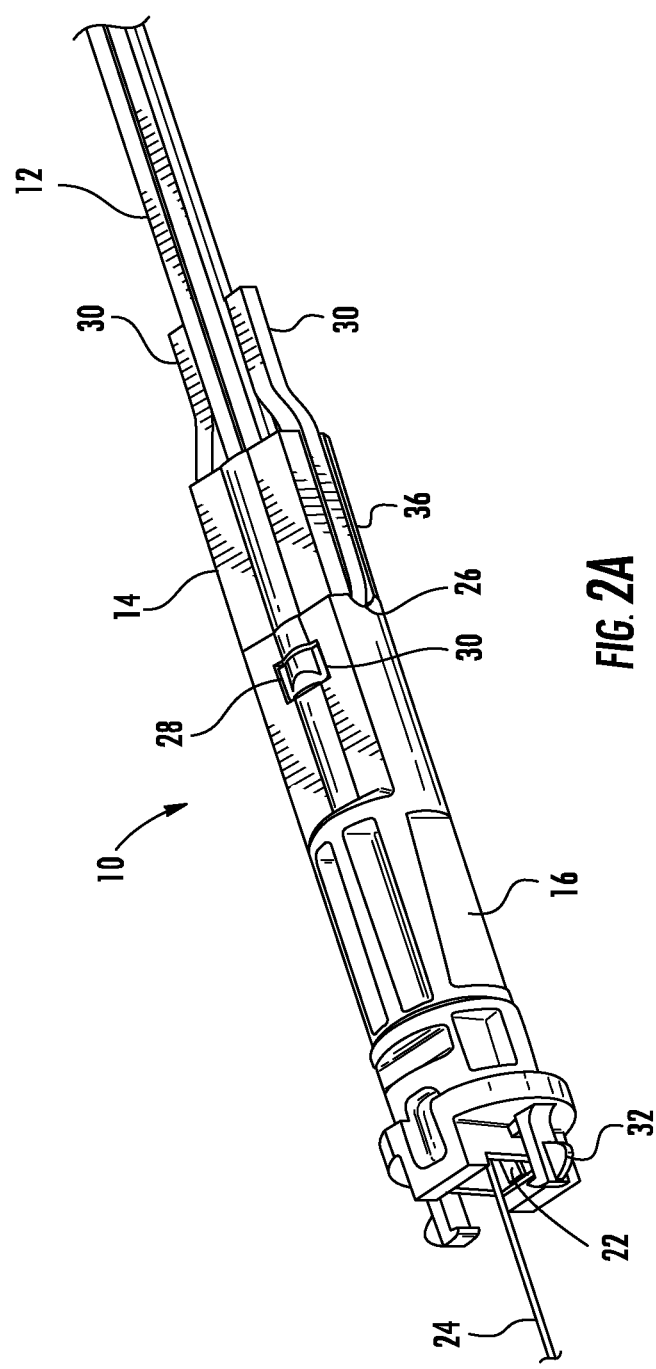
FIGS. 2A-2C are perspective views of a fiber optic connector employing the fiber optic connector sub-assembly of FIGS. 1A-1C.
Figure 2B:
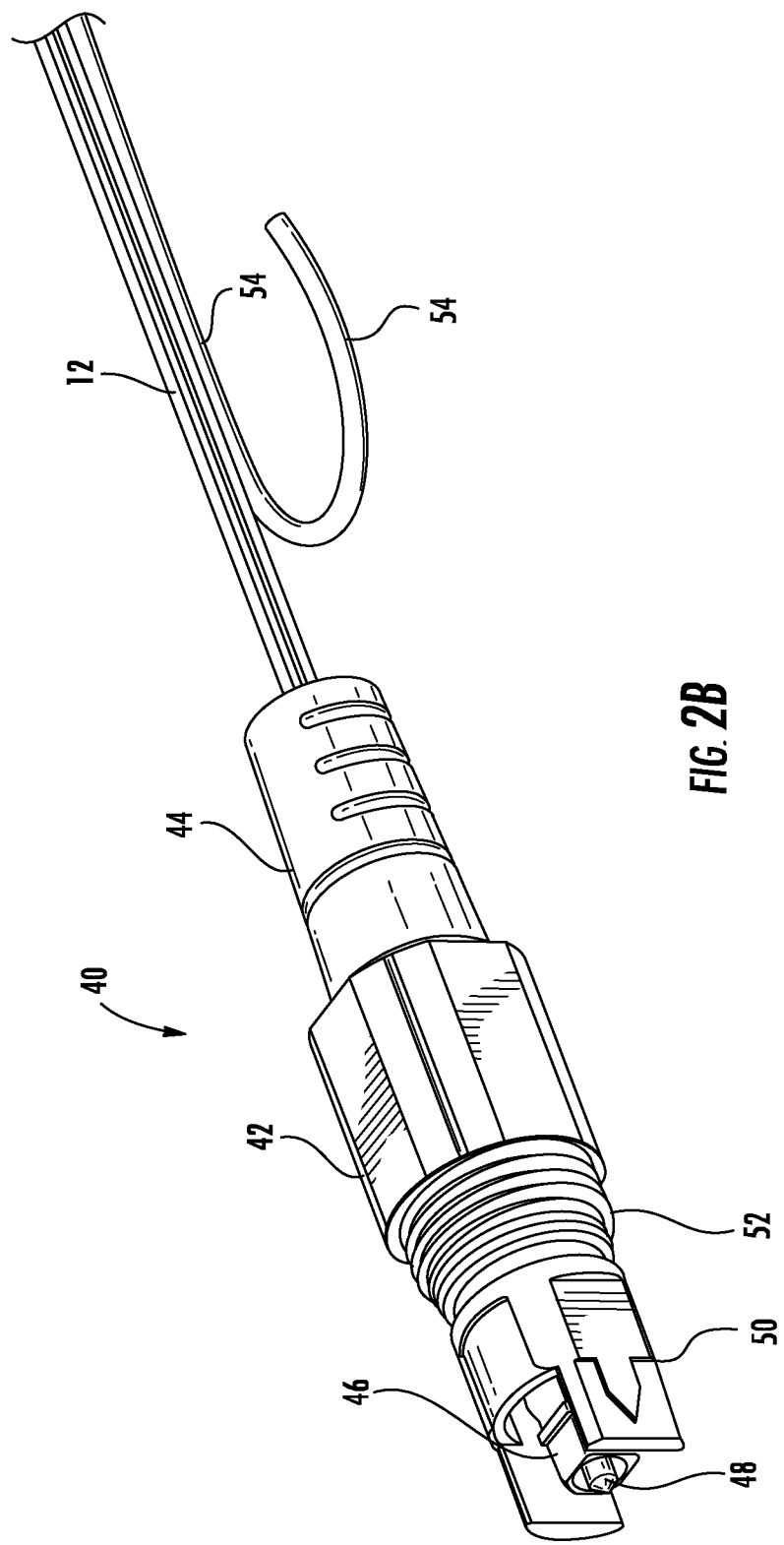

Once the fiber optic connector sub-assembly 10 is so assembled, the fiber optic connector sub-assembly 10 may be assembled with other components to produce a finished fiber optic connector (e.g., as shown in FIG. 2B). The fiber optic connector sub-assembly 10 may include one or more engagement features, such as engagement features 32, for connecting and retaining the fiber optic connector sub-assembly 10 with these other components.

Figure 1B:
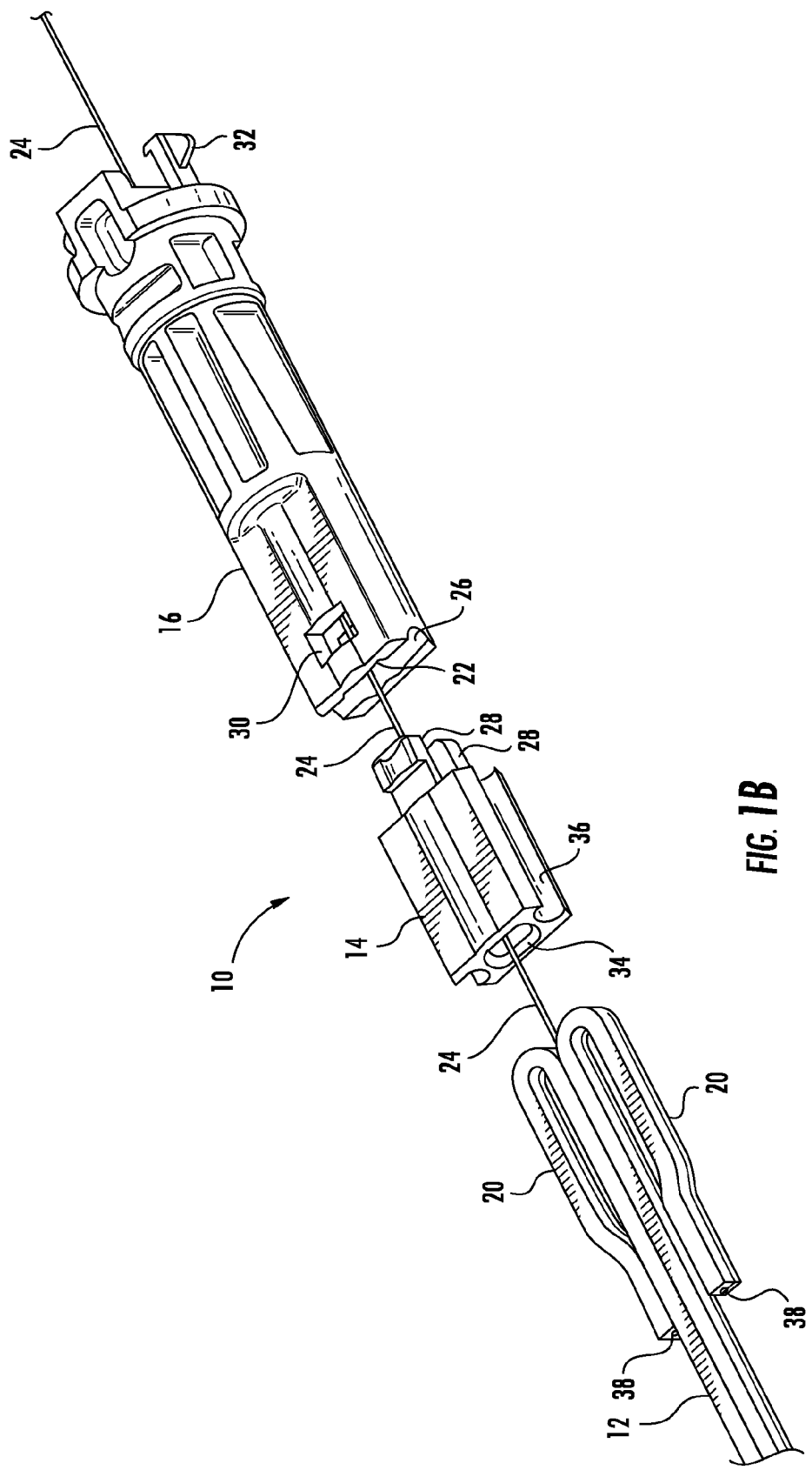

Referring now to FIG. 1B, an alternative disassembled view of the fiber optic connector sub-assembly 10 of FIG. 1A illustrating additional features of the fiber optic connector sub-assembly 10 is shown. In this regard, the cable lock 14 is shown with the fiber optic cable 12 removed from the cable channel 34 of the cable lock 14. In practice, the end portions of the strength member sheathings 20 would extend through the cable channel 34, and bend back around the strength member engagement surfaces 18 (See FIG. 1A). In this embodiment, the cable lock 14 also include a pair of strength member channels 36 for receiving the ends of the strength member sheathings 20 that extend beyond the strength member engagement surfaces 18, as shown in FIG. 1A.

Figure 1C:
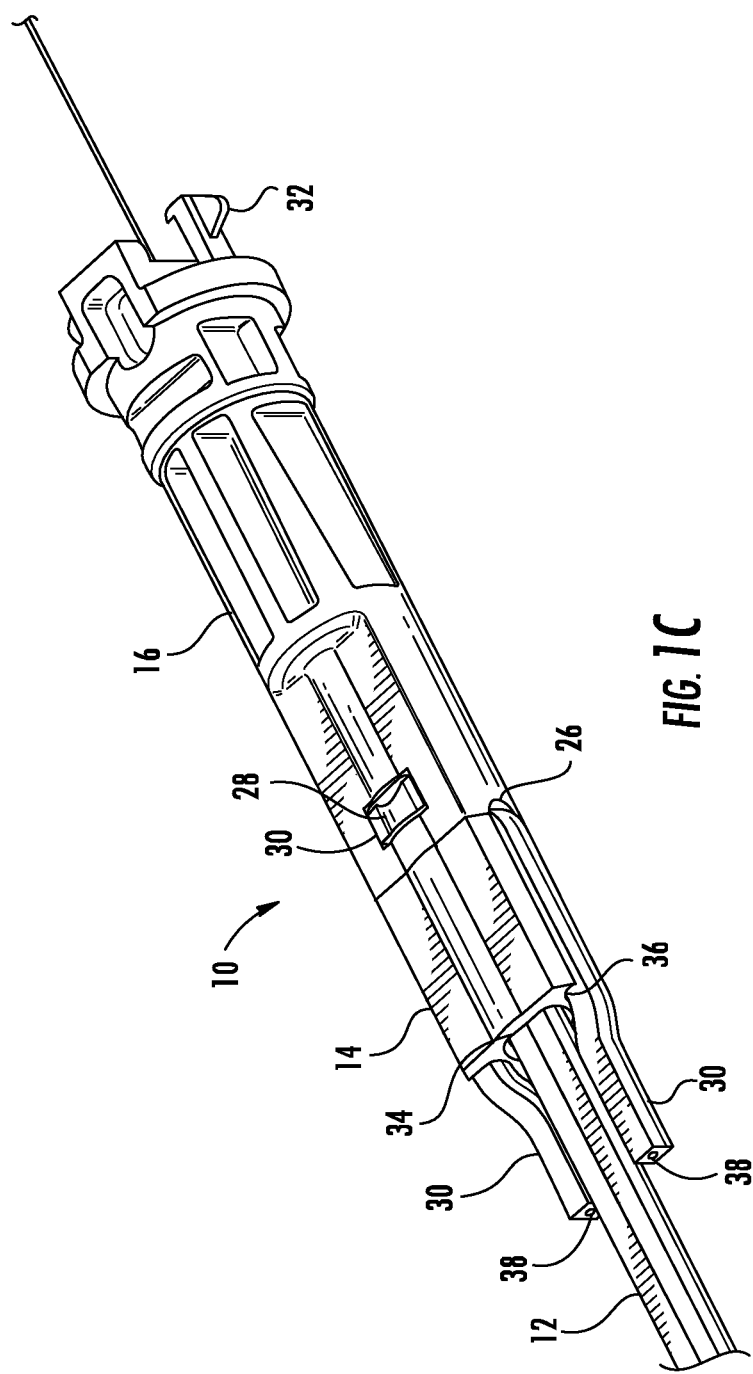

In this embodiment, as is common with Pixian™-type cables, each of the pair of strength member sheathings 20 has one or more strength members 38 disposed therein. In addition, the strength member sheathings 20 surround and protect the optical fiber 24. Specifically, the first strength member sheathing 20 includes a first strength member 38 disposed on a first side of optical fiber and a second strength member sheathing 20 includes a second strength member 38. During fiber optic connector assembly, end portions of the sheathings 20 are peeled away from the corresponding end portion of the optical fiber 24, with the strength members 38 remaining enclosed by the respective strength member sheathings 20. Thus, as shown in FIG. 1C, when the cable lock 14 and the retention body 16 are connected together in a longitudinal direction, i.e., the direction of a longitudinal axis defined by the cable channel 34 of the cable lock 14 and the optical fiber channel 22 of the retention body 16, the strength member engagement surfaces 18 of the cable lock 14 and the complementary strength member engagement surfaces 26 of the retention body 16 cooperate to compress a portion of the strength members sheathings 20 in the longitudinal direction. Because the strength members 38 are enclosed within the respective strength member sheathings 20, this compression of the strength member sheathings 20 also compresses the strength members 38 as well. Thus, the strength members 38 are securely retained in the fiber optic connector sub-assembly 10, thereby securing the cable 12 to the fiber optic connector sub-assembly 10 as well.

With the fiber optic cable 12 secured in the fiber optic connector sub-assembly 10, the fiber optic connector sub-assembly 10 can be assembled into a fiber optic connector. The concepts of the fiber optic connector sub-assembly 10 may be used with any suitable fiber optic connector and FIGS. 2A-2C depict an explanatory fiber optic connector employing the fiber optic sub-assembly 10.

Figure 2C:
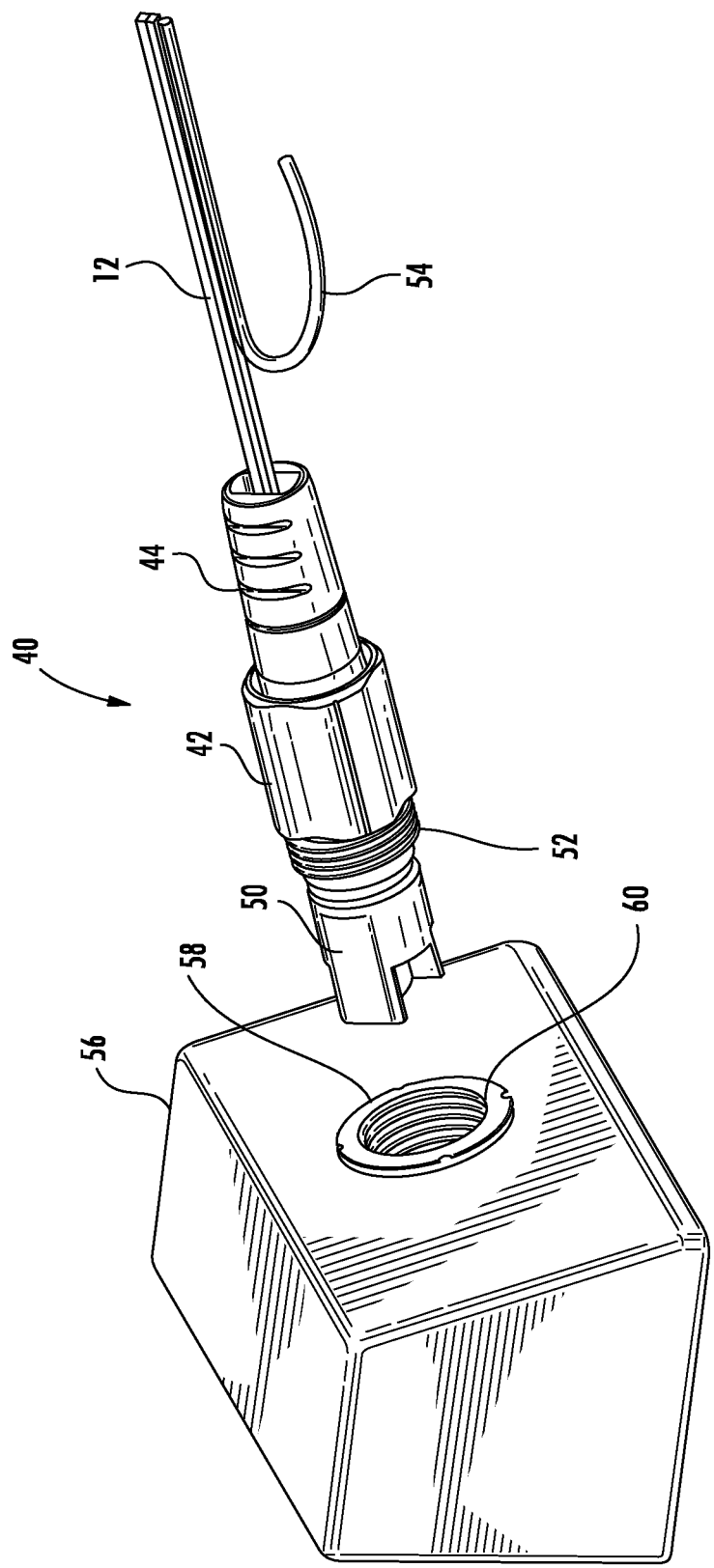

In this regard, FIGS. 2A-2C illustrate perspective views of fiber optic connector sub-assembly 10 along with other connector components, an assembled fiber optic connector 40, and insertion of the fiber optic connector 40 into a receptacle, respectively. Specifically, FIG. 2A depicts the fiber optic connector sub-assembly 10, a connector assembly 46 having a ferrule 48, a shroud 49 having alignment features 50 and a coupling member 42. As shown in FIG. 2B, the fiber optic connector outer housing 42 is disposed around a portion of the retention body 16 and other components, and a boot 44 is disposed about the cable lock 14, a portion of the fiber optic cable 12, and other components. A ferrule holder 46 is disposed at the end of the outer fiber optic connector outer housing 42, and a ferrule 48 is disposed in the ferrule holder 46 and receives the end portion of optical fiber 24 of fiber optic cable 12. The fiber optic connector 40 may also include alignment and retention features as well, such as alignment features 50 on the shroud, and threaded engagement feature 52 on the coupling member 42.

It can also be seen in FIG. 2B that the fiber optic cable 12 includes a stiffening member 54 running the length of the fiber optic cable 12. In some fiber optic cables, such as the Pixian™-type fiber optic cable 12 of this embodiment, the fiber optic cable 12 is manufactured to include the stiffening member 54 running the length of the cable 12. Before the end portion of cable 12 is connectorized, the stiffening member 54 is peeled back and away to permit more flexibility at the end of the cable 12, while retaining stiffness in the remainder of the cable 12.

Referring now to FIG. 2C, connection of the fiber optic connector 40 to fiber optic equipment 56 is illustrated. In this embodiment, the alignment feature 50 is inserted into receptacle 58, so that threaded engagement feature 52 mates with threaded engagement feature 60 of the receptacle 58. The fiber optic connector 40 is then rotated, to screw the fiber optic connector 40 into the receptacle 58 thereby securing the fiber optic connector 40 to the fiber optic equipment 56.

Figure 3A:
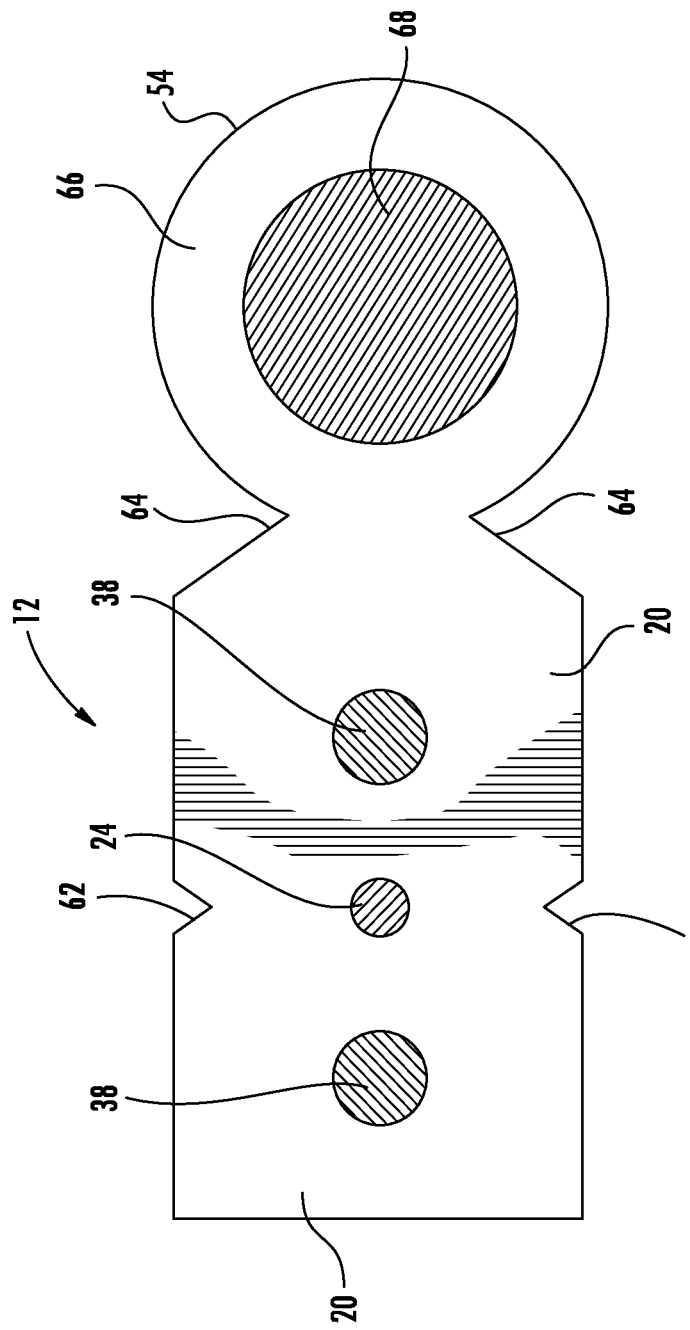

As discussed above, the fiber optic cable 12 used in many of the disclosed embodiments is a Pixian™-type fiber optic cable. In this regard, FIGS. 3A-3D illustrate the specific features of Pixian™-type fiber optic cable 12 and specific features relating to its engagement with cable lock 14. In this regard, FIG. 3A illustrates a cross-section of the fiber optic cable 12, illustrating a unitary strength member that encloses optical fiber 24 and strength members 38. A pair of grooves 62 running the length of the fiber optic cable 12 permits the strength member sheathing 20 to be easily peeled away from the optical fiber 24, without exposing strength members 38, thereby rendering the strength members 38 removably disposed with respect to the optical fiber 24 in the fiber optic cable 12. Similarly, another pair of grooves 64 permits easy separation of strength member sheathing 20 from stiffening member sheathing 66. Stiffening member sheathing 66 encloses a stiff core 68, which is also separated from the strength member sheathing 20 when stiffening member sheathing 66 is so separated.

Figure 3C:
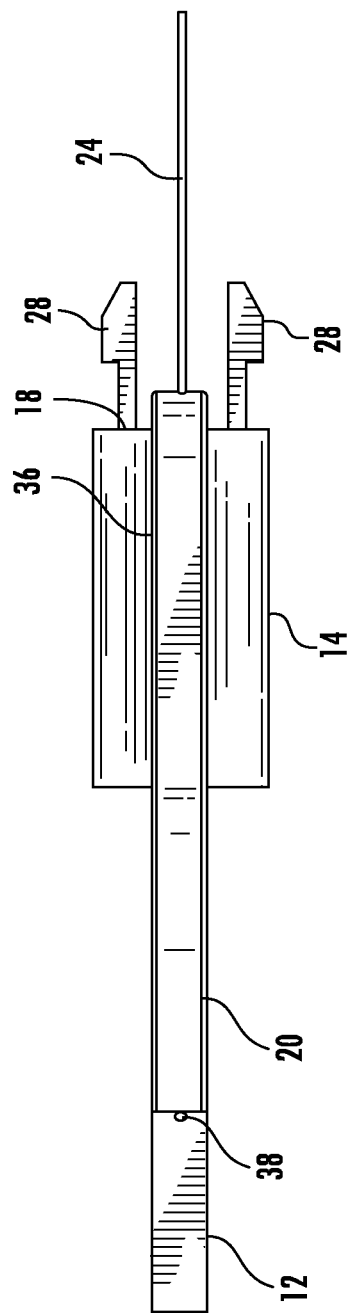
Figure 3D:
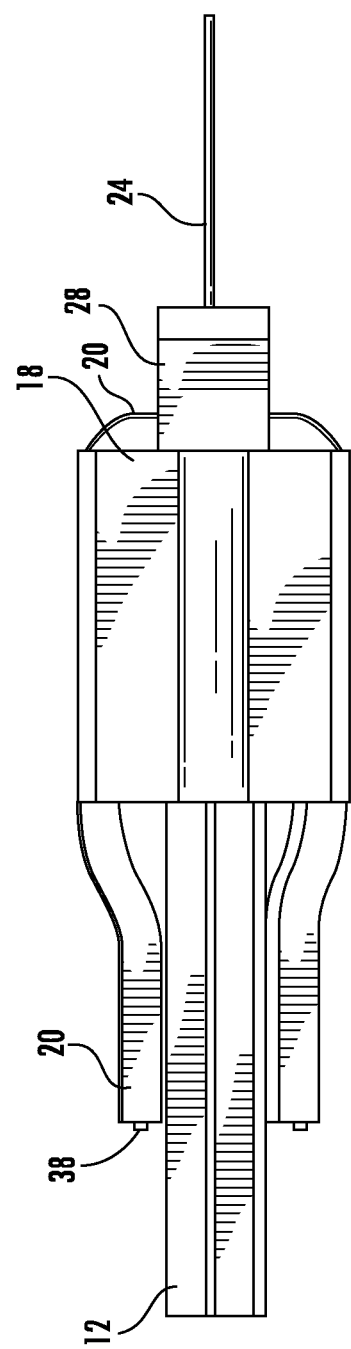

Referring now to FIG. 3B, cable lock 14 is illustrated having the end portion of fiber optic cable 12 extending therethrough. As shown in FIGS. 3C and 3D, the strength member sheathings 20 are then separated and peeled away from optical fiber 24, thereby exposing the end portion of optical fiber 24. Each strength member sheathing 20 is then bent back around strength member engagement surface 18 and nested into strength member channel 36. In this manner, a Pixian™-type fiber optic cable 12 or other fiber optic cable can be securely retained in the fiber optic connector sub-assembly 10 while retaining the compactness of the resultant fiber optic connector 40.

Figure 4:
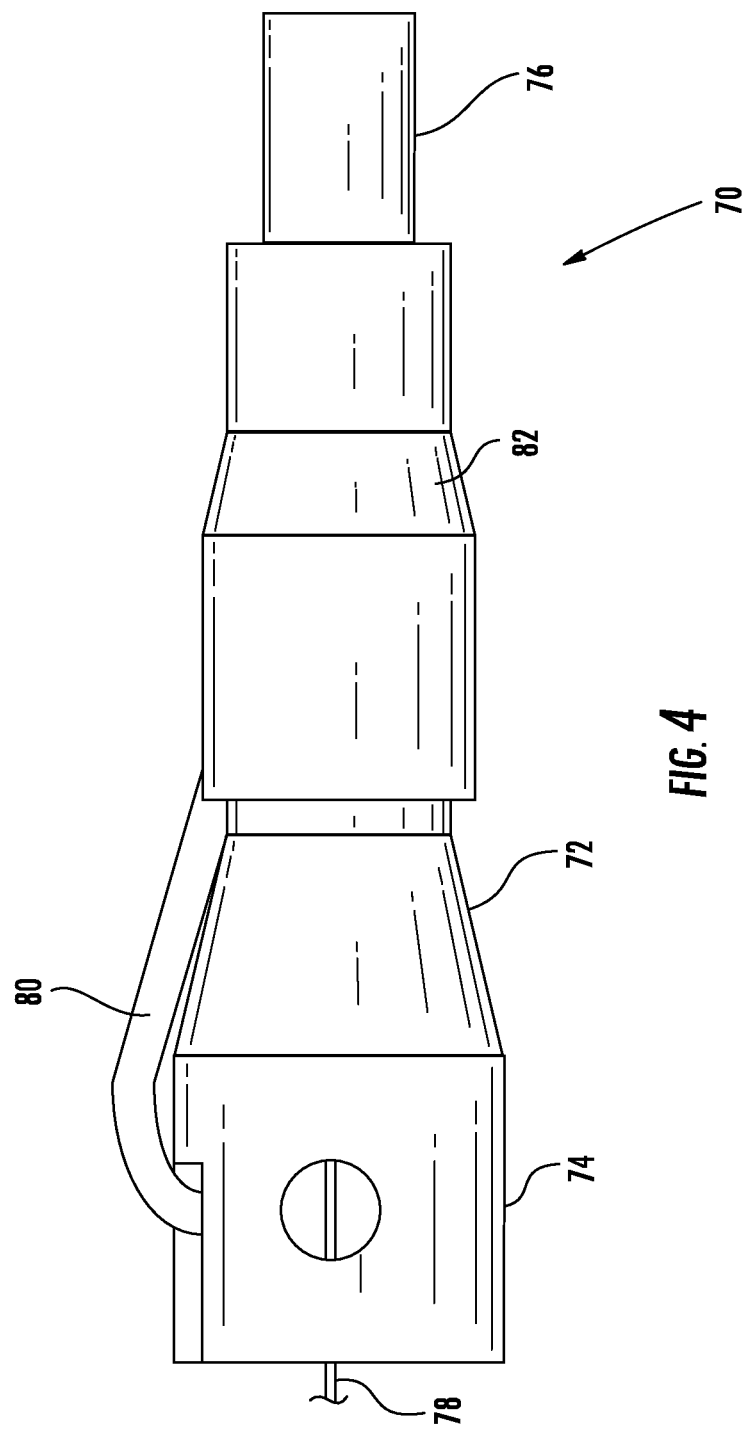
FIG. 4 is a side view of a fiber optic connector sub-assembly, according to an alternative embodiment, for securing and retaining an alternative type of fiber optic cable.

As discussed above, other types of fiber optic cables may be secured using similar components and techniques. In this regard, FIG. 4 illustrates a fiber optic connector sub-assembly 70 according to an alternate embodiment. The fiber optic connector sub-assembly 70 includes a retention body 72 having a crimp band portion 74 for receiving portions of a fiber optic cable 76, including an optical fiber 78 and one or more strength members 80 therethrough. In this embodiment, strength member 80 is routed around and back against retention body 72. A strength member securing element 82 such as a heat shrink, crimp band, or other component is then secured around the retention body 72 and strength member 80, thereby retaining the strength member 80 and fiber optic cable 76 to retention body 72 of fiber optic connector sub-assembly 70. In this and other embodiments, strength member securing element 82 may be a heat shrink that may include a heat-activated glue lining or other adhesive to increase the retention strength of the heat shrink to the strength member 80 and retention body 72. Of course, other strength member securing elements are possible using the concepts disclosed such as a crimp band or the like.

Figure 5:
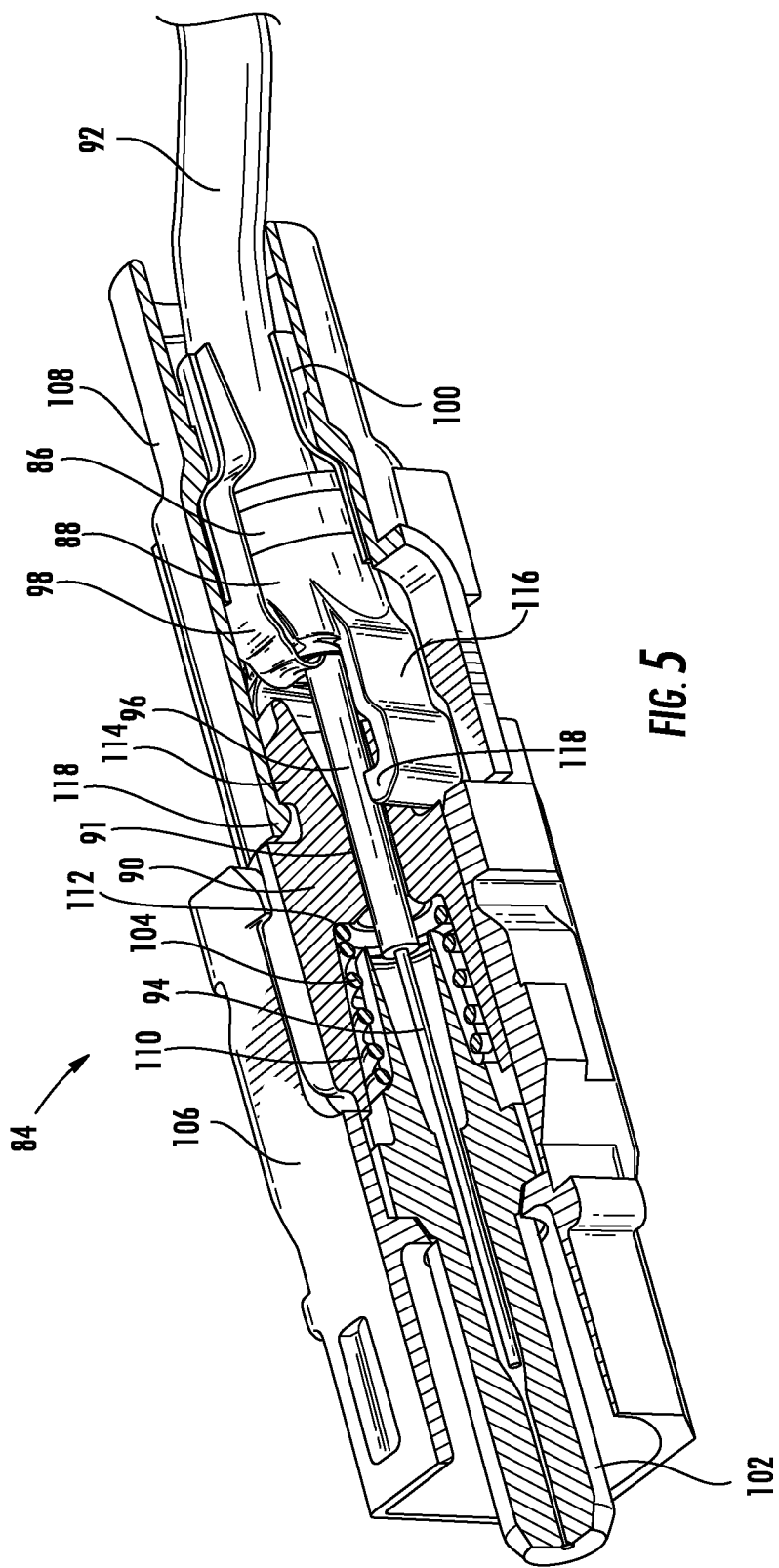
FIG. 5 is a perspective cutaway view of a fiber optic connector sub-assembly, according to an alternative embodiment, for securing and retaining an alternative type of fiber optic cable.

In another alternative embodiment shown in FIG. 5, an exemplary fiber optic connector housing sub-assembly 84 is shown. The fiber optic connector housing sub-assembly 84 includes a fiber optic connector sub-assembly 86 having a cable lock 88 and retention body 90. Cable lock 88 receives fiber optic cable 92 therethrough, and optical fiber 94 and its protective sheathing 96 are passed into a retention body 90, while one or more strength members 98 is routed back around the cable lock 88. A strength member securing element 100 such as a heat shrink is then applied around the strength member 98 and cable lock 88, thereby securing the fiber optic cable 92 in the cable lock 88.

Turning now to the retention body 90, a ferrule assembly 102 is seated in the retention body 90 against a spring 104 or other resilient element. An inner housing 106 is then disposed around the ferrule assembly 102 and a portion of retention body 90, while a boot 108 is disposed around an end of retention body 90 at the cable lock 88 and a portion of fiber optic cable 92. The fiber optic connector housing sub-assembly 84 can then be assembled as a completed fiber optic connector (not shown).

As shown in FIG. 5, ferrule assembly 102, retention body 90, and cable lock 88 are all aligned along a longitudinal access corresponding to optical fiber 94. In particular, ferrule assembly 102 is disposed within a ferrule holder portion 110 of retention body 90, in which spring 104 is disposed against a stop 112 of retention body 90. Retention body 90 also includes an edge 114 configured to engage and retain both a pair of arms 116 of cable lock 88, and similar engagement features 118 of boot 108.

Figure 6:
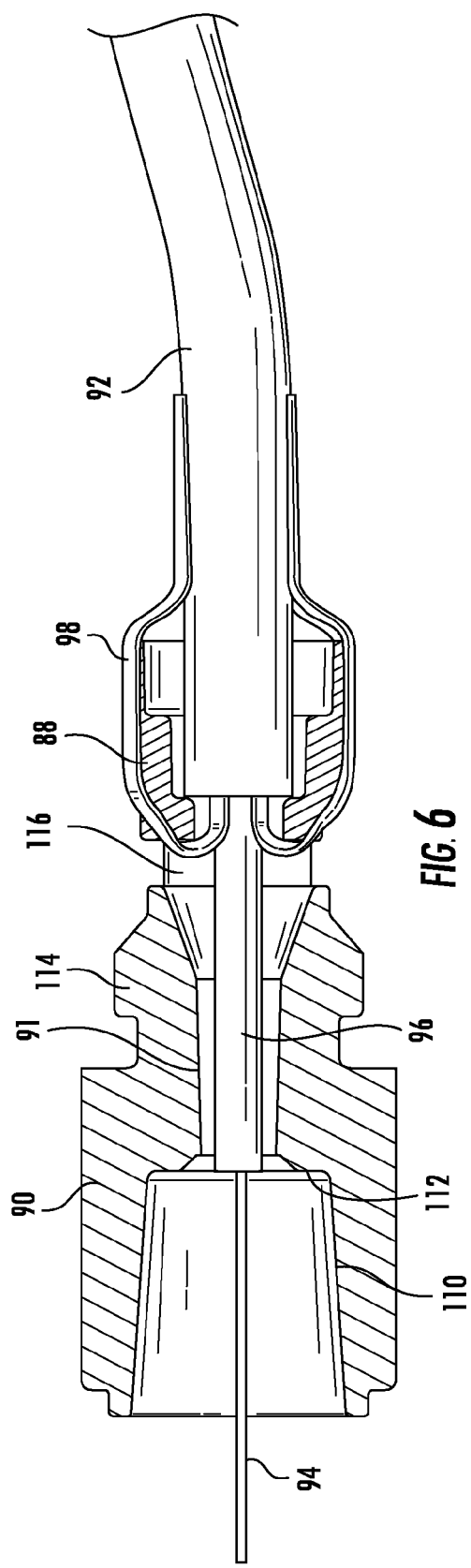
FIG. 6 is a cross-sectional view of a cable lock portion of the fiber optic connector sub-assembly of FIG. 5.

A simplified cross section view of cable lock 88 and retention body 90 is shown in FIG. 6. As discussed above with respect to FIG. 5, fiber optic cable 92 extends through cable lock 88, with the optical fiber 94 extending through the retention body 90, and the strength members 98 being retained against an outer surface of the cable lock 88.

Figure 7:
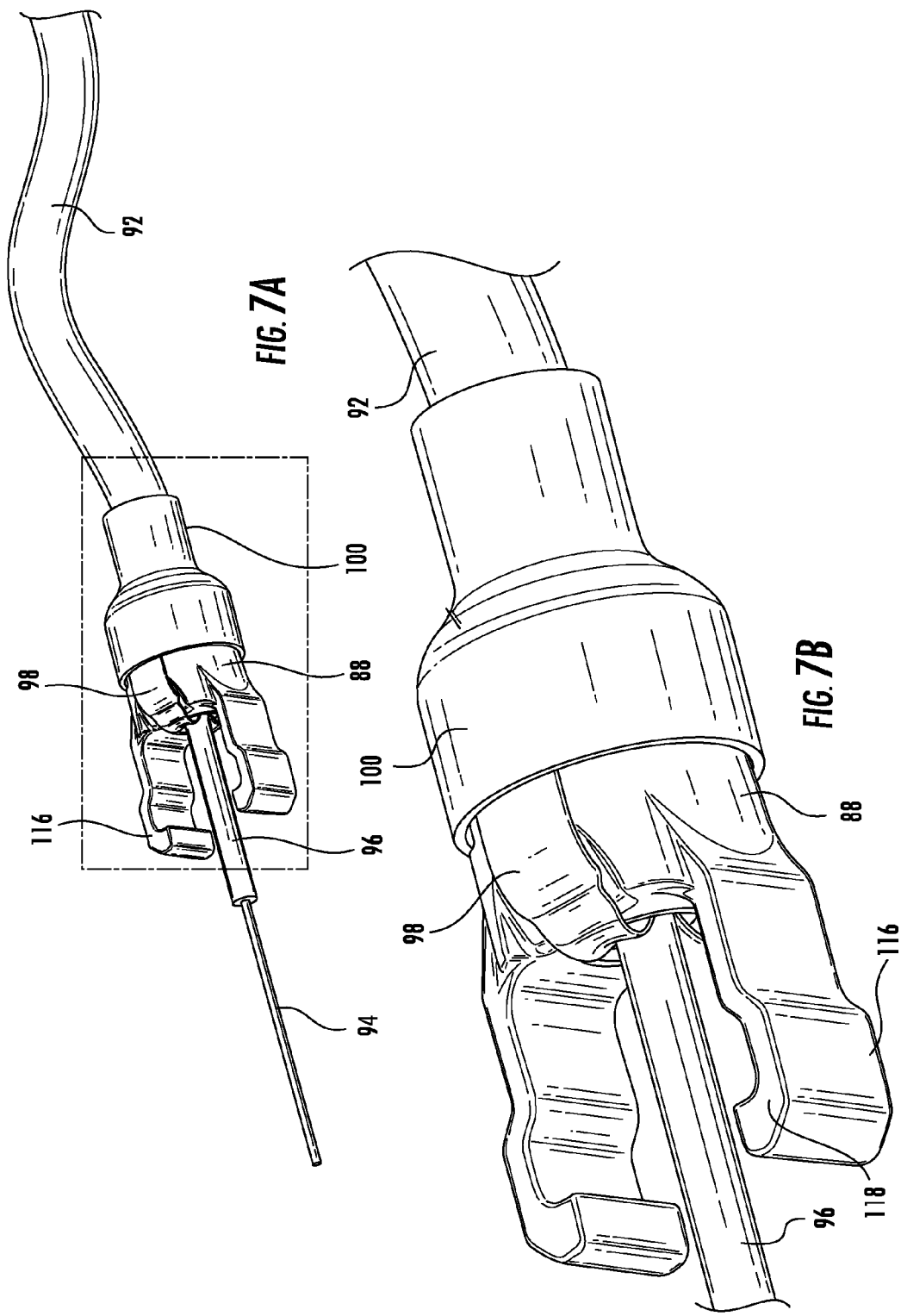
FIGS. 7A and 7B are perspective and detailed views of the cable lock portion of the fiber optic connector sub-assembly of FIGS. 5 and 6.

Referring now to FIGS. 7A and 7B, perspective views of cable lock 88 with fiber optic cable 92 disposed therein are illustrated. In particular, the specific structure of arms 116 are illustrated, including engagement features 118 configured to engage the edge 114 of retention body 90 (see FIG. 5) to secure and align the cable lock 88 to the retention body 90.

Figure 8:
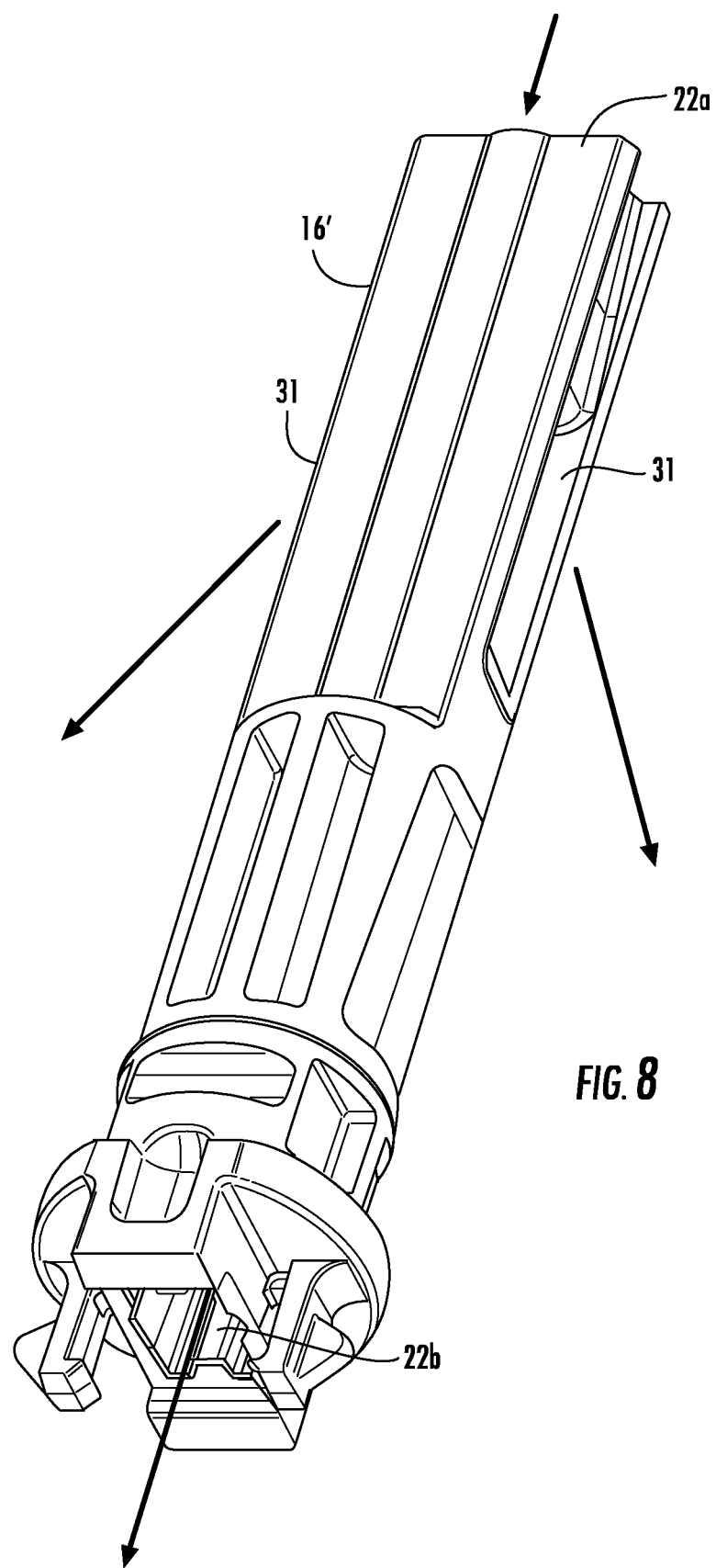
FIG. 8 is a perspective view of another retention body showing another fiber optic cable attach concept according to the concepts disclosed.
Figure 9:
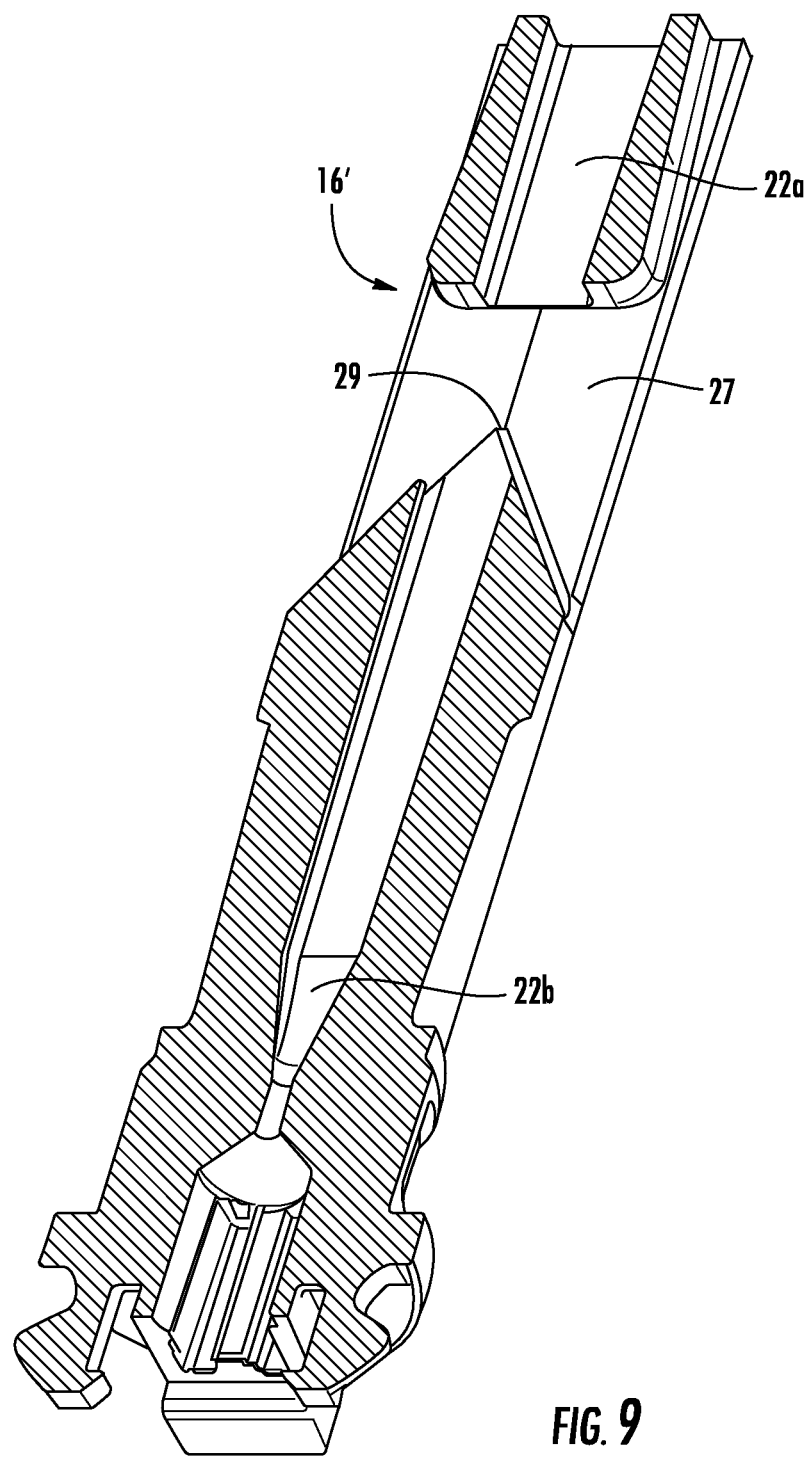
FIG. 9 is a cross-sectional view of the retention body depicted in FIG. 8 showing the details of the internal splitting feature.

Other variations of a retention body for a fiber optic connector sub-assembly are possible according to the concepts disclosed. FIG. 8 is a perspective view of another retention body 16' showing another fiber optic cable attach concept according to the concepts disclosed herein, and FIG. 9 is a longitudinal cross-sectional view of retention body 16'. Retention body 16' is similar to retention body 16 that comprises an optical fiber channel 22 for receiving an end portion of at least one optical fiber of the fiber optic cable therethrough, but retention body 16' does not require a cable lock for attaching the fiber optic cable. Instead, retention body 16' includes an internal splitting feature 29 as best shown in FIG. 9 along with a strength member securing element 100 (FIG. 10E).

Like the other embodiments disclosed, retention body 16' allows preparation of a fiber optic cable sub-assembly that secures and retains a fiber optic cable therein. Retention body 16' allows a simple and straight-forward preparation for securing a cable in the field or the factory. Further, field-preparation allows the craftsman to customized the length of the cable assembly for the particular deployment to avoid having to store excess cable slack and carrying several different lengths of preconnectorized cable assemblies into the field.

The internal splitting feature 29 of retention body 16' aids in separating one or more strength member sheathings 20 from the fiber optic cable 12 as the cable is inserted into the retention body 16'. For instance, fiber optic cable 12 may have the first strength member sheathing 20 and second strength member sheathing 20 from the optical fiber 24 as the as the fiber optic cable is fed into the retention body as described in more detail below with reference to FIGS. 10A-10H. Consequently, the craftsman need to only start the split of the first and second strength member sheathing 20 from the optical fiber 24 of the fiber optic cable and then the internal splitting feature is used for further splitting the strength member sheathings 20 from the optical fiber 24 as the cable is inserted into the retention body.

As best show in FIG. 9, the internal splitting feature 29 is disposed between a rear portion 22a of the optical fiber channel 22 and a front portion 22b of the optical fiber channel 22. The rear portion 22a and front portion 22b of the optical fiber channel 22 are separated by a region 27. Retention body 16' further comprises at least one exit opening 31 adjacent to the internal splitting feature 29. Internal splitting feature 29 may have any suitable shape for aiding the splitting of the strength member sheathing(s) 20 from the optical fiber 24 as the fiber optic cable 12 is inserted into the retention body. By way of example, the internal splitting feature 29 may have a wedge shape as depicted, but any suitable shape is possible according to the concepts disclosed. In this embodiment depicted the internal splitting feature 29 also has a pointed end. Retention body 16' may also have rounded corner portions 23 adjacent to the rear portion 22a of the optical fiber channel 22 for controlling a bend radius of the strength member sheathings as they are positioned rearward in the retention body 16'.

Retention body 16' may be configured for separating one or strength member sheathings 20 from the optical fiber 24 as desired. As depicted, retention body 16' comprises a first exit opening 31 adjacent to the internal splitting feature 29 and a second exit opening also adjacent to the internal splitting feature 29 for aiding the separation of first and second strength member sheathings 20 from the optical fiber 24. The first exit opening 31 may be disposed on an opposite side of the second exit opening 31 as depicted.

FIGS. 10A-10E show an explanatory method for receiving a fiber optic cable in the retention body of FIG. 8 to form a fiber optic connector sub-assembly such as show in FIG. 10E. The method comprises the steps of providing a fiber optic cable 12 having at least one FIGS. 10F-10H show further explanatory steps for forming a fiber optic connector from the fiber optic connector assembly according to the concepts disclosed. The method of making the fiber optic connector sub-assembly includes the steps of providing a fiber optic cable comprising at least one optical fiber, at least one strength member and a sheathing disposed about the at least one optical fiber and the at least one strength member, providing a retention body comprising an optical fiber channel and an internal splitting feature, and inserting a fiber optic cable through an optical fiber channel of the retention body and past the internal splitting feature for aiding a separation of the at least one strength member from the fiber optic cable with an end portion of the at least one strength member passing through an exit opening of the retention body; and securing the at least one strength member to the retention member using a strength element securing member.

Figure 10A:
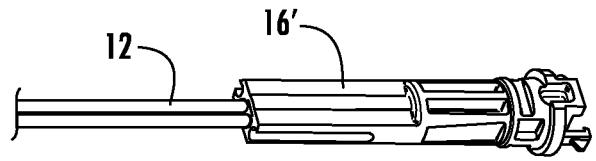
FIGS. 10A-10H show the retention body of FIG. 8 receiving a fiber optic cable to form a fiber optic connector sub-assembly and then being further assembled to a fiber optic connector having a ferrule.
Figure 10B:
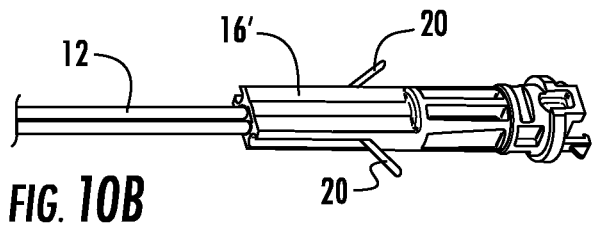
Figure 10C:
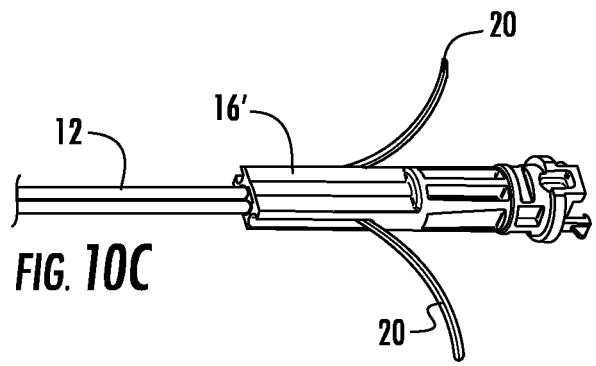
Figure 10D:
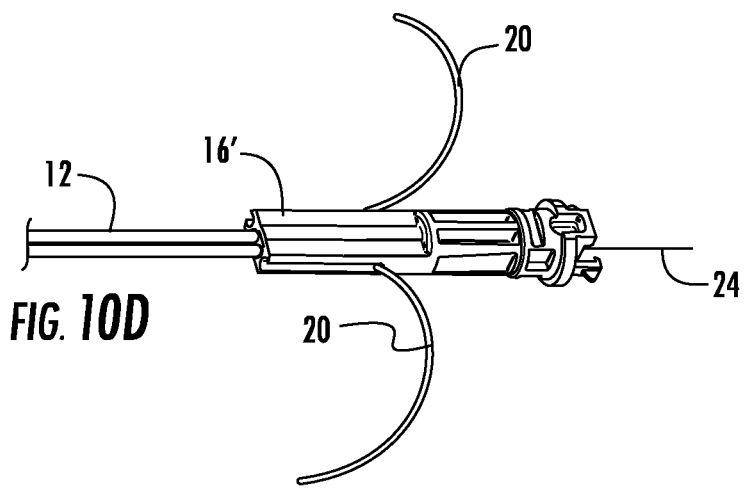
Figure 10E:
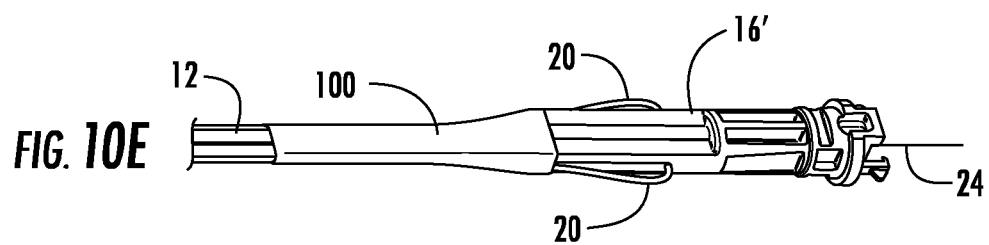
Figure 10F:
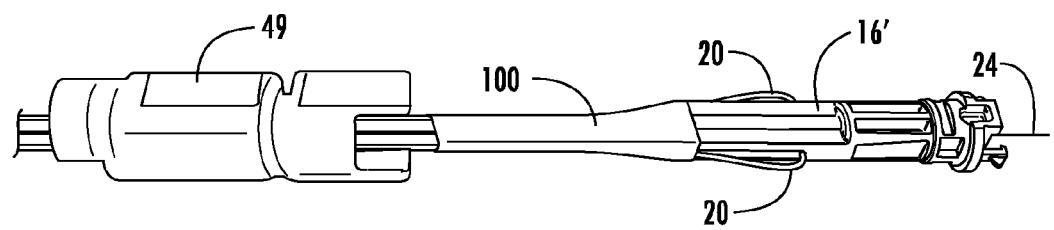
Figure 10G:
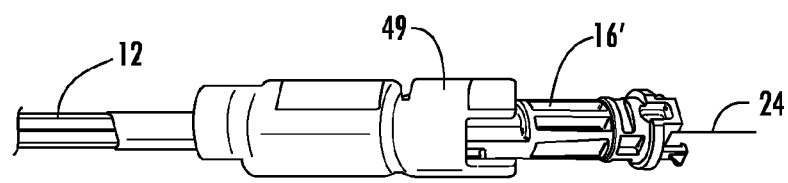
Figure 10H:
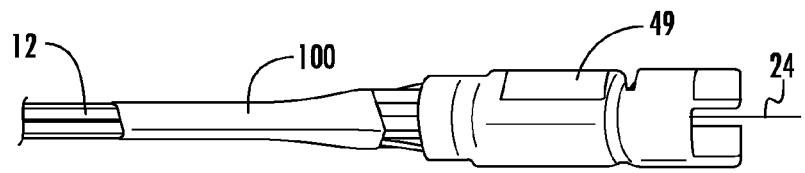

FIG. 10A depicts a fiber optic cable 12 being inserted into a rear end of a fiber optic channel 22 of retention body 16'. In this embodiment, fiber optic cable 12 has two strength member sheathings 20 disposed on opposite sides of the optical fiber 24, but other cables design may use the concepts disclosed. An initial split may be formed in the end of the fiber optic cable 12 so that the two strength member sheathings 20 are initially separated from the portion of the fiber optic cable 12 including the optical fiber 24. As the fiber optic cable 12 is inserted into the fiber optic channel 22 the strength member sheathings 20 will be separated further from the portion of the fiber optic cable 12 including the optical fiber 24 along the longitudinal length as the cable 12 moves past the internal splitting feature 29 of retention body 16'. FIG. 10B depicts the strength member sheathings 20 extending from the exit openings 31 disposed on opposite sides of retention body 16' while the portion of the cable 12 having the optical fiber 24 moves forward in the fiber optic channel 22 of retention body 16'. FIGS. 10C and 10D depict the strength member sheathings 20 further extending through respective exit openings 31 and be positioned toward the rearward direction of the retention body 16'. FIG. 10E depicts the strength member sheathings 20 fully disposed in the rearward direction of and being secured to retention body 16' using the strength element securing member 100, thereby forming the fiber optic connector sub-assembly. The strength element securing member 100 may be any suitable structure such as a heat shrink, a crimp band, a mechanical attachment or the like for securing the strength members or strength member sheathings of the fiber optic cable. A ferrule can be secured to the optical fiber 24 of the fiber optic sub-assembly for forming a fiber optic connector.

FIGS. 10F-10H depict further assembly steps for making an explanatory hardened fiber optic connector similar to fiber optic connector 40 depicted in FIG. 2B, but other suitable connectors may be formed from the fiber optic connector sub-assembly. In this embodiment, other components of the fiber optic connector are previously threaded onto the fiber optic cable such as a shroud 49, and as needed a coupling nut (not shown) heat shrink, boot or other components such as depicted in FIG. 10F. FIG. 10G depicts a connector assembly 46 having a ferrule 48 such as a SC connector for being mounted onto an end of optical fiber 24 and attached to retention body 16' such as engagement features 32 as known in the art. Of course, fiber optic connectors may use other connector types such as a LC, ST, MPO, MT or other known connectors. FIG. 10H depicts the explanatory fiber optic connector which may include further components as desired.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the application. Since modifications combinations, sub-combinations and variations of the disclosed embodiments incorporating the spirit and substance of the concepts may occur to persons skilled in the art, the application should be construed to include everything within the scope of the appended claims and their equivalents.

What is claimed is:

1. A fiber optic connector sub-assembly for securing and retaining a fiber optic cable therein, the fiber optic connector sub-assembly comprising:
   a cable lock comprising:
      a cable channel for receiving a fiber optic cable therethrough; and
      at least one strength member engagement surface of the cable lock; and
   a retention body comprising:
      an optical fiber channel for receiving an end portion of at least one optical fiber of the fiber optic cable therethrough; and
      at least one strength member engagement surface of the retention body configured to cooperate with the at least one strength member engagement surface of the cable lock to receive and retain at least one strength member of the fiber optic cable,
   wherein:
      at least one of the cable lock and the retention body comprises at least one tab configured to mate with a respective slot in the other of the cable lock and the retention body, and
      each of the at least one tab mates with the respective slot in a snap-fit arrangement.

2. The fiber optic connector sub-assembly of claim 1, further comprising a fiber optic cable comprising at least one optical fiber and at least one strength member removably disposed with respect to the at least one optical fiber,
   wherein an end portion of the at least one optical fiber is disposed in the optical fiber channel of the retention body; and
   wherein at least a portion of the at least one strength member corresponding to the end portion of the at least one optical fiber is disposed and retained between the strength member engagement surface of the cable lock and the at least one strength member engagement surface of the retention body.

3. The fiber optic connector sub-assembly of claim 2, wherein the at least one strength member a first strength member and a second strength member.

4. The fiber optic connector sub-assembly of claim 2, wherein the fiber optic cable further comprises a sheathing surrounding the at least one strength member, wherein the portion of the at least one strength member and the sheathing corresponding to the end portion of the at least one optical fiber is disposed and retained between the at least one strength member engagement surface of the cable lock and the at least one strength member engagement surface of the retention body.

5. The fiber optic connector sub-assembly of claim 1, wherein the at least one strength member engagement surface of the retention body and the at least one strength member engagement surface of the cable lock are configured to compress the at least one strength member of the fiber optic cable therebetween.

6. The fiber optic connector sub-assembly of claim 1, wherein the cable channel and the optical fiber channel define a longitudinal axis extending in a longitudinal direction, and
wherein the at least one strength member engagement surface of the retention body and the at least one strength member engagement surface of the cable lock are configured to compress the at least one strength member of the fiber optic cable therebetween in the longitudinal direction.

7. The fiber optic connector sub-assembly of claim 6, wherein at least a portion of one of the cable lock and the retention body is configured to be inserted into at least a portion of the other of the cable lock and the retention body in the longitudinal direction.

8. The fiber optic connector sub-assembly of claim 1, wherein the retention body comprises a heat shrink configured to compress around the cable lock to receive and retain the at least one strength member therebetween.

9. A fiber optic connector comprising:
a cable lock comprising:
a cable channel for receiving a fiber optic cable therethrough; and
at least one strength member engagement surface of the cable lock; and
a retention body comprising:
an optical fiber channel for receiving an end portion of at least one optical fiber of the fiber optic cable therethrough; and
at least one strength member engagement surface of the retention body configured to cooperate with the at least one strength member engagement surface of the cable lock to receive and retain at least one strength member of the fiber optic cable;
a ferrule configured to receive the end portion of the at least one optical fiber; and
a fiber optic connector housing sub-assembly for enclosing and retaining the cable lock, the retention body, and the ferrule,
wherein:
the cable channel, the optical fiber channel, and the ferrule define a longitudinal axis extending in a longitudinal direction, and
the at least one strength member engagement surface of the retention body and the at least one strength member engagement surface of the cable lock are configured to compress the at least one strength member of the fiber optic cable therebetween in the longitudinal direction.

10. The fiber optic connector of claim 9, further comprising a fiber optic cable comprising at least one optical fiber and at least one strength member removably disposed with respect to the at least one optical fiber,
wherein an end portion of the at least one optical fiber is disposed in the ferrule through the optical fiber channel of the retention body; and
wherein at least a portion of the at least one strength member corresponding to the end portion of the at least one optical fiber is disposed and retained between the at least one strength member engagement surface of the cable lock and the at least one strength member engagement surface of the retention body.

11. The fiber optic connector of claim 10, wherein the at least one strength member of the fiber optic cable comprises a first strength member and a second strength member.

12. The fiber optic connector of claim 10, wherein the fiber optic cable further comprises a sheathing surrounding the at least one strength member, wherein the portion of the at least one strength member and the sheathing is disposed and retained between the at least one strength member engagement surface of the cable lock and the at least one strength member engagement surface of the retention body.

13. The fiber optic connector of claim 9, wherein the at least one strength member engagement surface of the retention body and the at least one strength member engagement surface of the cable lock are configured to compress the at least one strength member of the fiber optic cable therebetween.

14. The fiber optic connector of claim 9, wherein at least a portion of one of the cable lock and the retention body is configured to be inserted into at least a portion of the other of the cable lock and the retention body in the longitudinal direction.

15. The fiber optic connector of claim 9, wherein at least one of the cable lock and the retention body comprises at least one tab configured to mate with a respective slot in the other of the cable lock and the retention body.

16. The fiber optic connector of claim 15, wherein each of the at least one tab mates with the respective slot in a snap-fit arrangement.

17. The fiber optic connector of claim 9, wherein the fiber optic connector housing sub-assembly comprises:
an inner housing configured to receive and retain the ferrule; and
a boot configured to receive the fiber optic cable;
wherein the inner housing and the boot cooperate to enclose and retain the cable lock and retention body.

18. The fiber optic connector of claim 10, wherein the fiber optic connector housing sub-assembly further comprises an outer fiber optic connector housing and a boot, wherein the outer fiber optic connector housing and the boot cooperate to enclose and retain the inner housing and the boot.

19. A method of assembling a fiber optic connector comprising:
inserting a fiber optic cable through a cable channel of a cable lock of a fiber optic connector sub-assembly, the fiber optic cable comprising at least one optical fiber, at least one strength member, and a sheathing enclosing the at least one optical fiber and the at least one strength member;
removing at least one portion of the sheathing and a portion of the at least one strength member from an end portion of at least one optical fiber to expose an end portion of the at least one optical fiber;

bending the portion of the at least one strength member back around at least one strength member engagement surface of the cable lock in a rearward direction;

inserting the at least one optical fiber through an optical fiber channel of a retention body; and connecting the cable lock to the retention body such that the portion of the at least one strength member is compressed between the at least one strength member engagement surface of the cable lock and the at least one strength member engagement surface of the retention body.

20. The method of claim 19, further comprising disposing the portion of the sheathing adjacent the at least one strength member engagement surface of the cable lock;

wherein connecting the cable lock to the retention body causes the portion of the sheathing and the portion of the at least one strength member to be compressed between the at least one strength member engagement surface of the cable lock and the at least one strength member engagement surface of the retention body.

21. The method of claim 20, further comprising disposing the end portion of the optical fiber in a ferrule; and disposing the cable lock, the retention body, and the ferrule in a fiber optic connector housing sub-assembly.

22. A fiber optic connector sub-assembly for securing and retaining a fiber optic cable therein, the fiber optic connector sub-assembly comprising:

a fiber optic cable comprising at least one optical fiber and at least one strength member removably disposed with respect to the at least one optical fiber;

a cable lock comprising:
  a cable channel, wherein the fiber optic cable is disposed within the cable channel; and
  at least one strength member engagement surface of the cable lock; and a retention body comprising:
  an optical fiber channel, wherein an end portion of at least one optical fiber of the fiber optic cable is disposed in the optical fiber channel of the retention body; and
  at least one strength member engagement surface of the retention body, wherein the at least a portion of the at least one strength member corresponding to the end portion of the at least one optical fiber is bent back around the at least one strength member engagement surface of the retention body such that the at least one strength member is disposed and retained between the at least one strength member engagement surface of the cable lock and the at least one strength member engagement surface of the retention body; and
  a heat shrink configured to compress around the cable lock to receive and retain the at least one strength member therebetween.

23. The fiber optic connector sub-assembly of claim 22, wherein the at least one strength member a first strength member and a second strength member.

24. The fiber optic connector sub-assembly of claim 22, wherein the fiber optic cable further comprises a sheathing surrounding the at least one strength member, wherein the portion of the at least one strength member and the sheathing corresponding to the end portion of the at least one optical fiber is disposed and retained between the at least one strength member engagement surface of the cable lock and the at least one strength member engagement surface of the retention body.

25. The fiber optic connector sub-assembly of claim 22, wherein the at least one strength member engagement surface of the retention body and the at least one strength member engagement surface of the cable lock are configured to compress the at least one strength member of the fiber optic cable therebetween.

26. The fiber optic connector sub-assembly of claim 22, wherein the cable channel and the optical fiber channel define a longitudinal axis extending in a longitudinal direction, and wherein the at least one strength member engagement surface of the retention body and the at least one strength member engagement surface of the cable lock are configured to compress the at least one strength member of the fiber optic cable therebetween in the longitudinal direction.

27. The fiber optic connector sub-assembly of claim 26, wherein at least a portion of one of the cable lock and the retention body is configured to be inserted into at least a portion of the other of the cable lock and the retention body in the longitudinal direction.

28. The fiber optic connector sub-assembly of claim 22, wherein at least one of the cable lock and the retention body comprises at least one tab configured to mate with a respective slot in the other of the cable lock and the retention body.

29. The fiber optic connector sub-assembly of claim 28, wherein each of the at least one tab mates with the respective slot in a snap-fit arrangement.

30. A fiber optic connector sub-assembly for securing and retaining a fiber optic cable therein, the fiber optic connector sub-assembly comprising:

a cable lock comprising:
  a cable channel for receiving a fiber optic cable therethrough; and
  at least one strength member engagement surface of the cable lock; and a retention body comprising:
  an optical fiber channel for receiving an end portion of at least one optical fiber of the fiber optic cable therethrough; and
  at least one strength member engagement surface of the retention body configured to cooperate with the at least one strength member engagement surface of the cable lock to receive and retain at least one strength member of the fiber optic cable, wherein at least one of the cable lock and the retention body comprises at least one tab configured to mate with a respective slot in the other of the cable lock and the retention body.

31. The fiber optic connector sub-assembly of claim 30, further comprising a fiber optic cable comprising at least one optical fiber and at least one strength member removably disposed with respect to the at least one optical fiber, wherein an end portion of the at least one optical fiber is disposed in the optical fiber channel of the retention body; and wherein at least a portion of the at least one strength member corresponding to the end portion of the at least one optical fiber is disposed and retained between the strength member engagement surface of the cable lock and the at least one strength member engagement surface of the retention body.

32. The fiber optic connector sub-assembly of claim 31, wherein the at least one strength member a first strength member and a second strength member.

33. The fiber optic connector sub-assembly of claim 31, wherein the fiber optic cable further comprises a sheathing surrounding the at least one strength member, wherein the portion of the at least one strength member and the sheathing corresponding to the end portion of the at least one optical fiber is disposed and retained between the at least one strength member engagement surface of the cable lock and the at least one strength member engagement surface of the retention body.

34. The fiber optic connector sub-assembly of claim 30, wherein the at least one strength member engagement surface of the retention body and the at least one strength member engagement surface of the cable lock are configured to compress the at least one strength member of the fiber optic cable therebetween.

35. The fiber optic connector sub-assembly of claim 1, wherein the cable lock further comprises at least one strength member channel for receiving an end portion of the at least one strength member of the fiber optic cable.

36. The fiber optic connector of claim 9, wherein the cable lock further comprises at least one strength member channel for receiving an end portion of the at least one strength member of the fiber optic cable.

37. The fiber optic connector sub-assembly of claim 30, wherein the cable lock further comprises at least one strength member channel for receiving an end portion of the at least one strength member of the fiber optic cable.

* * * * *